US012581135B2

(12) United States Patent
Kim et al.

(10) Patent No.: US 12,581,135 B2
(45) Date of Patent: \*Mar. 17, 2026

(54) APPARATUS AND METHOD WITH VIDEO PROCESSING USING NEURAL NETWORK

(71) Applicant: SAMSUNG ELECTRONICS CO., LTD., Suwon-si (KR)

(72) Inventors: Seungeon Kim, Suwon-si (KR); Wonhee Lee, Suwon-si (KR); Kyungboo Jung, Suwon-si (KR); Woosuk Choi, Suwon-si (KR); Young Hun Sung, Suwon-si (KR); Dokwan Oh, Suwon-si (KR)

(73) Assignee: SAMSUNG ELECTRONICS CO., LTD., Suwon-si (KR)

( \* ) Notice: Subject to any disclaimer, the term of this patent is extended or adjusted under 35 U.S.C. 154(b) by 49 days.

This patent is subject to a terminal disclaimer.

(21) Appl. No.: 18/415,247

(22) Filed: Jan. 17, 2024

(65) Prior Publication Data

US 2024/0244273 A1 Jul. 18, 2024

Related U.S. Application Data

(63) Continuation-in-part of application No. 18/343,916, filed on Jun. 29, 2023.

(30) Foreign Application Priority Data

Jan. 17, 2023 (KR) ........................ 10-2023-0006675
Aug. 2, 2023 (KR) ........................ 10-2023-0101225

(51) Int. Cl.
H04N 19/13 (2014.01)
G06V 10/82 (2022.01)
(Continued)

(52) U.S. Cl.
CPC ............. *H04N 19/91* (2014.11); *G06V 10/82* (2022.01); *H04N 19/119* (2014.11);
(Continued)

(58) Field of Classification Search
CPC ........ H04N 19/13; H04N 19/51; H04N 19/70; H04N 19/91
See application file for complete search history.

(56) References Cited

U.S. PATENT DOCUMENTS 10,104,391 B2 10/2018 Su et al.
10,123,053 B2 11/2018 Sze et al.
(Continued)

FOREIGN PATENT DOCUMENTS

KR 10-2022-0124622 A 9/2022

OTHER PUBLICATIONS

Laude, Thorsten, et al., "Deep Learning-Based Intra Prediction Mode Decision For HEVC," Picture Coding Symposium, IEEE, 2016, (5 Pages in English).
(Continued)

*Primary Examiner* — James T Boylan
(74) *Attorney, Agent, or Firm* — MORGAN, LEWIS & BOCKIUS LLP

(57) ABSTRACT

An apparatus with video processing includes one or more processors configured to generate a syntax element processable by a target standard codec by inputting a quantization parameter, a pre-decoded reference image, and a plurality of frames comprised in a video to a neural network and compressing the plurality of frames, and generate a bitstream by performing entropy encoding on the syntax element.

22 Claims, 8 Drawing Sheets

(51) Int. Cl.

| | |
|---|---|
| *H04N 19/119* | (2014.01) |
| *H04N 19/159* | (2014.01) |
| *H04N 19/184* | (2014.01) |
| *H04N 19/51* | (2014.01) |
| *H04N 19/70* | (2014.01) |
| *H04N 19/91* | (2014.01) |

(52) U.S. Cl.
CPC ......... *H04N 19/159* (2014.11); *H04N 19/184* (2014.11); *H04N 19/51* (2014.11); *H04N 19/70* (2014.11)

(56)                  References Cited

U.S. PATENT DOCUMENTS

| | | | |
|---|---|---|---|
| 11,190,782 B2 | 11/2021 | Park et al. | |
| 11,330,264 B2 | 5/2022 | Zhou et al. | |
| 2023/0007246 A1* | 1/2023 | Li | H04N 19/117 |

OTHER PUBLICATIONS

Liu, Zhenyu, et al., "CU Partition Mode Decision for HEVC Hardwired Intra Encoder Using Convolution Neural Network," IEEE Transactions on Image Processing, vol. 25, No. 11, Nov. 2016, (p. 5088-5103).

Li, Jiahao, et al., "Intra Prediction Using Fully Connected Network for Video Coding," IEEE International Conference on Image Processing, 2017, (5 Pages in English).

Lee, Jung Kyung, et al., "Convolution Neural Network Based Video Coding Technique Using Reference Video Synthesis," Asia-Pacific Signal and Information Processing Association Annual Summit and Conference, Nov. 12-15, 2018 (p. 505-508).

Zhao, Zhenghui, et al., "CNN-Based Bi-Directional Motion Compensation for High Efficiency Video Coding," 2018 IEEE International Symposium on Circuits and Systems (ISCAS), 2018, (4 Pages in English).

Xu, Mai, et al., "Reducing Complexity of HEVC: A Deep Learning Approach," IEEE Transactions on Image Processing, vol. 27, No. 10, Oct. 2018, (p. 5044-5059).

Lu, Guo, et al., "DVC: An End-To-End Deep Video Compression Framework," Proceedings of the IEEE/CVF Conference on Computer Vision and Pattern Recognition, 2019, (p. 11006-11015).

* cited by examiner

APPARATUS AND METHOD WITH VIDEO PROCESSING USING NEURAL NETWORK

CROSS-REFERENCE TO RELATED APPLICATIONS

This application is a continuation-in-part of U.S. patent application Ser. No. 18/343,916, filed on Jun. 29, 2023, and claims the benefit under 35 USC § 119(a) of Korean Patent Application No. 10-2023-0006675, filed on Jan. 17, 2023, and Korean Patent Application No. 10-2023-0101225, filed on Aug. 2, 2023 in the Korean Intellectual Property Office, the entire disclosures of which are incorporated herein by reference for all purposes.

BACKGROUND

1. Field

The following description relates to an apparatus and method with video processing using a neural network.

2. Description of Related Art

A standard codec may be divided into an encoder and a decoder. Encoding and decoding may be processed by dividing a frame into blocks and a processing method may vary depending on the type of standard codec. High-efficiency video coding (HEVC) may divide a coding unit in a predetermined size in the units of coding tree unit (CTU), and the CTU may be partitioned in a coding unit (CU), which is a basic unit of coding divided in the form of a quad tree. In HEVC, one of intra-prediction and inter-prediction may exist and depending on the type of prediction, the shape of a prediction unit (PU) partition, a prediction direction of a PU, and a motion vector may be determined. HEVC may transform in the units of transform unit (TU) and may terminate encoding by performing quantization. Quantized data may be transmitted to a decoder or may be used for encoding another CU after the quantized data is decoded. In this case, the size of CU, PU, and TU may be determined by performing rate-distortion optimization (RDO) using a brute-force search and may be affected by a quantization parameter (QP).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an apparatus with video processing includes: one or more processors configured to: generate a syntax element processable by a target standard codec by inputting a quantization parameter, a pre-decoded reference image, and a plurality of frames comprised in a video to a neural network and compressing the plurality of frames, and generate a bitstream by performing entropy encoding on the syntax element.

The syntax element may include a coding unit (CU) partition, a compression mode, a prediction unit (PU) partition, a PU prediction mode, and a transform unit (TU) partition.

The pre-decoded reference image may be decoded at a time point before a time point when input frame is encoded.

For the generating of the pre-decoded reference image, the one or more processors may be configured to: generate a decoded syntax element by performing entropy decoding on the bitstream, and generate the pre-decoded reference image by decompressing the decoded syntax element.

The decoded syntax element may be decodable by a target decoder comprising a decoder of a standard codec.

The neural network may include a first neural network and a second neural network.

For the generating of the bitstream, the one or more processors may be configured to: select one from an output of the first neural network and an output of the second neural network, and perform entropy encoding on the selected output.

For the generating of the syntax element, the one or more processors may be configured to perform either one or both of: intra-prediction through the first neural network; and inter-prediction through the second neural network.

For the generating of the syntax element, the one or more processors may be configured to: partition the plurality of frames into a plurality of blocks through the first neural network, and perform motion estimation and compensation by inputting the plurality of blocks to the second neural network.

For the generating of the syntax element, the one or more processors may be configured to adjust the quantization parameter based on a shape of adaptive instance normalization of a layer constituting the neural network and a product or sum of features at an arbitrary level.

For the generating of the syntax element, the one or more processors may be configured to receive decoder information on a decoder to perform decoding among a plurality of decoders, and generate the syntax element by considering the decoder information.

In one or more general aspects, a processor-implemented with video processing includes: generating a syntax element processable by a target standard codec by inputting a quantization parameter, a pre-decoded reference image, and a plurality of frames comprised in a video to a neural network and compressing the plurality of frames; and generating a bitstream by performing entropy encoding on the syntax element.

The syntax element may include a coding unit (CU) partition, a compression mode, a prediction unit (PU) partition, a PU prediction mode, and a transform unit (TU) partition.

The pre-decoded reference image may be decoded at a time point before a time point when input frame is encoded.

The generating of the pre-decoded reference image may include: generating a decoded syntax element by performing entropy decoding on the bitstream; and generating the pre-decoded reference image by decompressing the decoded syntax element.

The decoded syntax element may be decodable by a target decoder comprising a decoder of a standard codec.

The neural network may include a first neural network and a second neural network.

The generating of the bitstream may include: selecting one from an output of the first neural network and an output of the second neural network; and performing entropy encoding on the selected output.

The generating of the syntax element may include either one or both of: performing intra-prediction through the first neural network; and performing inter-prediction through the second neural network.

The generating of the syntax element may include: partitioning the plurality of frames into a plurality of blocks through the first neural network; and performing motion estimation and compensation by inputting the plurality of blocks to the second neural network.

The generating of the syntax element may include adjusting the quantization parameter based on a shape of adaptive instance normalization of a layer constituting the neural network and a product or sum of features at an arbitrary level.

The generating of the syntax element may include receiving decoder information on a decoder to perform decoding among a plurality of decoders; and generating the syntax element by considering the decoder information.

Other features and aspects will be apparent from the following detailed description, the drawings, and the claims.

Figure 1:
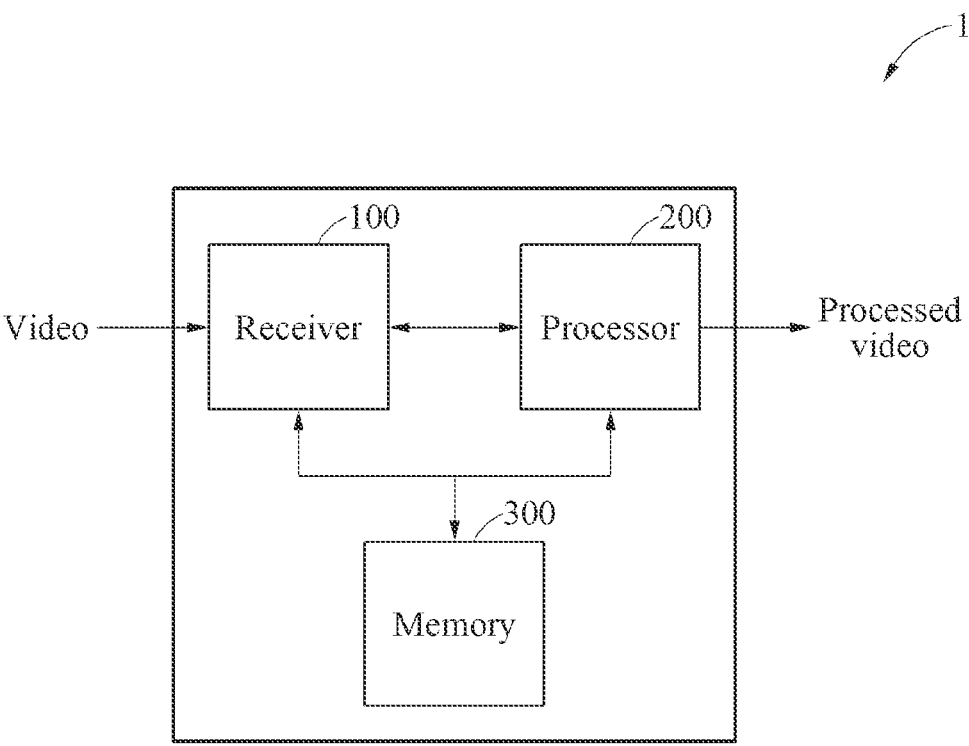
FIG. 1 illustrates an example of a video processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which the present disclosure pertains and based on an understanding of the disclosure of the present application. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Although terms, such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment, e.g., as to what an example or embodiment may include or implement, means that at least one example or embodiment exists where such a feature is included or implemented, while all examples are not limited thereto.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 illustrates an example of a video processing apparatus.

Referring to FIG. 1, a video processing apparatus 10 may process a video. The video processing apparatus 10 may generate a processed video by processing the video. The video processing apparatus 10 may generate an encoded video by encoding the video. The video processing apparatus 10 may generate a reconstructed video by decoding the encoded video.

The video processing apparatus 10 may generate a compressed video by compressing the video. The video processing apparatus 10 may generate a reconstructed video by decompressing the compressed video.

The video processing apparatus 10 may process the video using a neural network. The video processing apparatus 10 may perform encoding and/or decoding using the neural network.

The neural network may be a model that has the ability to solve a problem, where nodes forming the network through connection combinations change a connection strength of connections through training.

The nodes of the neural network may include a combination of weights or biases. The neural network may include one or more layers each including one or more nodes. The neural network may infer a desired result from a predetermined input by changing the weights of the nodes through training.

The neural network may include a deep neural network (DNN). The neural network may include a convolutional neural network (CNN), a recurrent neural network (RN N), a perceptron, a multilayer perceptron, a feed forward (FF) network, a radial basis network (RBF), a deep feed forward (DFF) network, a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), a binarized neural network (BNN), a transformer, and/or an attention network (AN).

The video processing apparatus 10 may be, or be implemented in, a personal computer (PC), a data server, and/or a portable device.

The portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and/or a smart device. The smart device may be implemented as a smart watch, a smart band, and/or a smart ring.

The video processing apparatus 10 may perform a neural network operation using an accelerator. The video processing apparatus 10 may be implemented inside or outside the accelerator. The video processing apparatus 10 may include the accelerator.

The accelerator may include a neural processing unit (NPU), a graphics processing unit (GPU), a field-programmable gate array (FPGA), an application-specific integrated circuit (ASIC), and/or an application processor (AP). Alternatively, the accelerator may be implemented as a software computing environment, such as a virtual machine.

The video processing apparatus 10 may include a receiver 100, a processor 200 (e.g., one or more processors), and a memory 300 (e.g., one or more memories).

The receiver 100 may include a receiving interface. The receiver 100 may receive data. The receiver 100 may receive data from an external device or the memory 300. The receiver 100 may output received data to the processor 200. The receiver 100 may receive a video including a plurality of frames.

The processor 200 may process data received from the receiver 100 and/or data stored in the memory 300. The processor 200 may process data stored in the memory 300. The processor 200 may execute computer-readable code (for example, software) stored in the memory 300 and instructions triggered by the processor 200. For example, the memory 300 may be or include a non-transitory computer-readable storage medium storing instructions that, when executed by the processor 200, configure the processor 200 to perform any one, any combination, or all of the operations and methods described herein with reference to FIGS. 1-6.

The processor 200 may be a hardware data processing device including a circuit having a physical structure to perform desired operations. For example, the desired operations may include code or instructions included in a program.

The hardware data processing device may be or include, for example, a microprocessor, a central processing unit (CPU), a processor core, a multi-core processor, a multiprocessor, an ASIC, and/or an FPGA.

The processor 200 may generate a syntax element processable by a target standard codec by compressing a plurality of frames by inputting a quantization parameter (QP), a pre-decoded reference image, and the plurality of frames to the neural network.

The syntax element may include a coding unit (CU) partition, a compression mode, a prediction unit (PU) partition, a PU prediction mode, and a transform unit (TU) partition.

The CU partition may refer to partitioning a coding tree unit (CTU) unit into various CUs. The compression mode may include an intra mode, an inter mode, and a skip mode.

The PU partition may refer to partitioning a CU into units for prediction. The PU prediction mode may be a prediction mode that is advantageous for predicted compression in a PU. The TU partition may refer to partitioning a CU by a size that is advantageous for compression based on transformation.

The syntax element may include information on a reference frame and motion estimation information. The information on the reference frame may include information on selection of a reference image used for compression (or mutual prediction) in a decoded picture buffer. The motion estimation information may refer to estimating block position information used for generating a prediction image for each PU.

The processor 200 may include a first neural network and a second neural network. The first neural network may be different from the second neural network.

The processor 200 may adjust the QP based on the shape of adaptive instance normalization of a layer constituting the neural network and a product or sum of features at an arbitrary level.

The processor 200 may generate a pre-decoded reference image by decoding a bitstream generated based on a frame that is decoded at a previous time point of the current time point among the plurality of frames. Because the decoding order of the reference image may vary depending on a prediction mode, the frame decoded at the previous time point may include an image of a future time point in a temporal aspect.

The processor 200 may generate a decoded syntax element by performing entropy decoding on a bitstream. The processor 200 may generate a pre-decoded reference image by decompressing the decoded syntax element.

The decoded syntax element may be decoded by a target decoder including a decoder of a standard codec. The standard codec may include advanced video coding (AVC), high-efficiency video coding (HEVC), versatile video coding (VVC), AOMedia video 1 (AV1), VP9, and/or essential video coding (EVC).

The processor 200 may train the neural network. The processor 200 may train the neural network based on a rate-distortion (RD) loss. The processor 200 may determine a balance parameter based on the QP. The processor 200 may calculate the RD loss based on the balance parameter and the syntax element.

The processor 200 may perform intra-prediction through the first neural network. The processor 200 may perform inter-prediction through the second neural network.

The processor 200 may select one from an output of the first neural network and an output of the second neural network. The processor 200 may perform entropy encoding on the selected output.

The processor 200 may partition the plurality of frames into a plurality of blocks through the first neural network. The processor 200 may perform motion estimation and compensation by inputting the plurality of blocks to the second neural network.

The processor 200 may generate a bitstream by performing entropy encoding on the syntax element.

The memory 300 stores instructions (or programs) executable by the processor 200. For example, the instructions may include instructions for performing the operation of the processor 200 and/or an operation of each component of the processor 200.

The memory 300 may be implemented as a volatile or non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EE-PROM), flash memory, magnetic RAM (MRAM), spin-transfer torque (STT)-MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, a molecular electronic memory device, and/or insulator resistance change memory.

Figure 2:
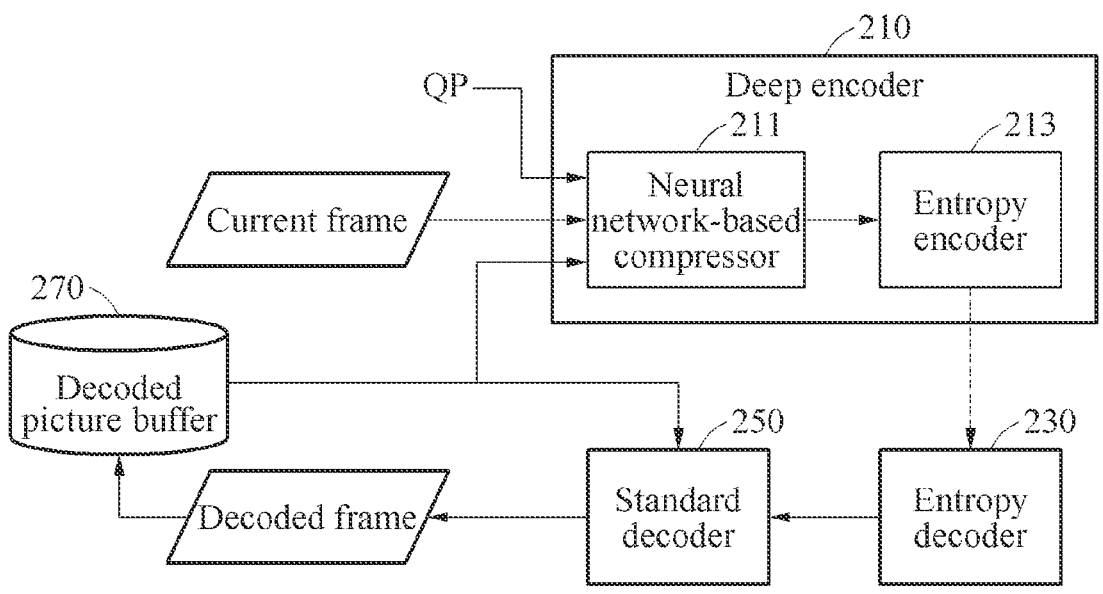
FIG. 2 illustrates an example of implementation of a video processing apparatus.

FIG. 2 illustrates an example of implementation of a video processing apparatus (e.g., the video processing apparatus 10 of FIG. 1).

Referring to FIG. 2, a processor (e.g., the processor 200 of FIG. 1) may include a deep encoder 210. The deep encoder 210 may include a neural network-based compressor 211 and an entropy encoder 213.

The processor 200 may further include an entropy decoder 230 and a standard decoder 250. The entropy decoder 230 and the standard decoder 250 may be included in a decoder. Depending on an embodiment, the entropy decoder 230 and the standard decoder 250 may be implemented as hardware that is different from the processor 200.

The deep encoder 210 may operate in an NPU or a GPU. The deep encoder 210 may be designed based on various generations of video codecs. Even when a new standard video codec is released, the deep encoder 210 may be applied to a device through software update without modifying existing hardware. Since the deep encoder 210 operates in NPU and GPU environments, rapid performance speed may be guaranteed without further hardware acceleration.

The deep encoder 210 may generate, from an input video, a bitstream interpretable by a decoder (e.g., the standard decoder 250) of a standard video codec. The deep encoder 210 may receive a current frame included in the video. The deep encoder 210 may receive, from a decoded picture buffer 270, a decoded reference image that is used for encoding. The deep encoder 210 may receive a QP.

The neural network-based compressor 211 may generate a syntax element converted at a compression rate that is suitable for the QP using a list of decoded reference images obtained by decoding an input current frame or a decoded portion of a current frame.

The entropy encoder 213 may receive the syntax element, may generate a bitstream, may transmit the bitstream to the decoder, or may store the bitstream in a memory (e.g., the memory 300 of FIG. 2).

The entropy decoder 230 may generate a syntax element from the received bitstream. The standard decoder 250 may reconstruct a decoded frame using an image stored in the decoded picture buffer 270. The standard decoder 250 may include HEVC.

The decoded picture buffer 270 may store a decoded frame to perform encoding and decoding on a frame at a subsequent time point. An encoder (e.g., the deep encoder 210) and a decoder may include and/or use the same decoded picture buffer 270. The deep encoder 210 may generate a decoded frame by applying the same decoding process to a bitstream that is converted to use the same reference image as the decoder and may store the decoded frame in the decoded picture buffer 270.

The deep encoder 210 may generate a bitstream from an input video. The deep encoder 210 may operate to be compatible with a conventional standard video codec. The bitstream generated by the deep encoder 210 may be interpreted by a decoder of the standard video codec, and an image may be reconstructed from the bitstream using an arbitrary video decoder in compliance with the same standard.

The deep encoder 210 may convert an input frame into a syntax element using the neural network-based compressor 211 and may generate a bitstream by performing lossless compression on the syntax element based on a statistical characteristic of the syntax element through the entropy encoder 213.

The deep encoder 210 may train the neural network. A label structure of the syntax element may have the same structure as the standard codec. The deep encoder 210 may train the neural network to process an output corresponding to each of the plurality of input frames by a standard decoder.

The deep encoder 210 may build a database by obtaining a syntax element for an arbitrary input video using an encoder of a reference program of a standard video codec and may train the neural network by supervised learning.

The deep encoder 210 may train the neural network by unsupervised or self-supervised learning. The deep encoder 210 may perform unsupervised learning using an RD loss.

Distortion may be a term representing an error of a decoded frame and may be mathematically defined based on a difference between an input image and an image obtained by performing actual decoding using a prediction result of the neural network. The decoder may be a module constituted by a differentiable operator and may be implemented such that the deep encoder 210 may learn through approximation.

A rate may have a value corresponding to the length of an encoded bitstream. Based on an assumption that probability distribution is ideally estimated, the rate may be the same as an entropy value of a syntax element. In other words, the rate may be mathematically defined based on an entropy of a syntax element.

The deep encoder 210 may adjust the rate based on a QP. The deep encoder 210 may use a balance parameter lambda adjusting a balance between a rate and distortion. For example, the deep encoder 210 may define a loss adjusting a balance between a rate and distortion as Equation 1 below, for example.

$$loss=rate+lambda(QP)*distortion \qquad \text{Equation 1}$$

The deep encoder 210 may train the neural network by unsupervised learning as the deep encoder 210 trains a defined RD loss for various images.

The bitstream that is an output of the entropy encoder 213 may be interpreted by a decoder of the standard video codec.

Figure 3:
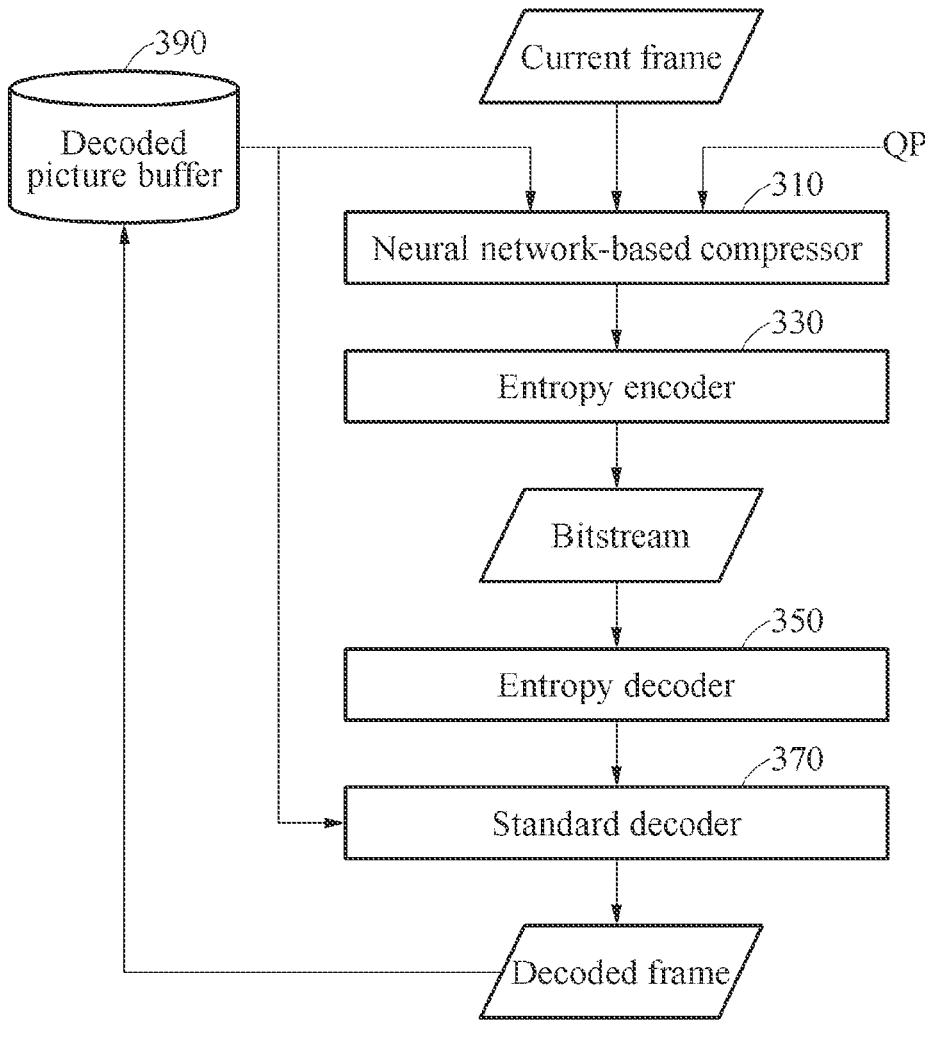
FIG. 3 illustrates an example of an operation of a video processing apparatus.

FIG. 3 illustrates an example of an operation of a video processing apparatus (e.g., the video processing apparatus of FIG. 2).

Referring to FIG. 3, a processor (e.g., the processor 200 of FIG. 1) may generate a bitstream from a current frame using a deep encoder (e.g., the deep encoder 210 of FIG. 2). The processor 200 may generate a decoded frame by reconstructing the bitstream using a decoder of the standard video codec.

The deep encoder 210 may be implemented on a mobile system on chip (SoC) equipped with an NPU. The deep encoder 210 may be applied to various products performing video compression.

The deep encoder 210 may convert a current input frame into a bitstream for video compression. The bitstream may be interpreted by a decoder of a target standard codec and may be reconstructed as an image. The target standard codec may include HEVC, VVC, H.264/MPEG-4 AVC, and/or A1. The target standard codec may include an unreleased next-generation codec.

The deep encoder 210 of one or more embodiments may be implemented as a single framework supporting multiple codecs and may thus process a video with high efficiency and may provide scalability. The deep encoder 210 may support a plurality of codecs through software update on the single framework.

The deep encoder 210 of one or more embodiments may not need to change hardware and an SoC area even if the codec generation has changed. The deep encoder 210 of one or more embodiments may efficiently support acceleration in high-performance NPU and GPU hardware environments through software update even if a new codec is not released.

The deep encoder 210 of one or more embodiments may reduce efforts and costs incurred to implement an ASIC for acceleration of an encoder in a typical standard video compression codec by operating a neural network compatible with a target decoder on an NPU mounted on a mobile SoC.

The deep encoder 210 of one or more embodiments may support accelerated encoding through an NPU without consuming a cost and an additional chip design for hardware acceleration.

The deep encoder 210 may include a neural network-based compressor 310 and an entropy encoder 330. The neural network-based compressor 310 may be implemented based on a neural network.

The neural network-based compressor 310 may generate a syntax element from a current frame using a reference image and/or an image element included in the reference image.

The neural network-based compressor 310 may generate a syntax element by changing a compression rate based on a QP. The neural network-based compressor 310 may control the compression rate using the QP as an input. The neural network-based compressor 310 may control the compression rate using the shape of adaptive instance normalization of a layer constituting the neural network or a product or sum of features at an arbitrary level.

The entropy encoder 330 may convert the syntax element into a bitstream. The entropy encoder 330 may use the same algorithm as an entropy coding algorithm used by a decoder of a target standard codec. The bitstream may be transmitted to a decoder by wire or a wireless communication channel and may be stored in a storage medium (e.g., the memory 300 of FIG. 1).

The entropy encoder 330 may determine an algorithm used by an entropy decoder 350 used in the target standard decoder.

To encode a frame of a subsequent time point, the deep encoder 210 may decode the bitstream by performing the same process on the decoder side and may store the decoded bitstream in a decoded picture buffer 390.

The decoder may include the entropy decoder 350 and a standard decoder 370. The entropy decoder 350 may convert the bitstream into a syntax element. The standard decoder 370 may convert the syntax element into a decoded frame using a decoding algorithm of the standard video codec.

The standard decoder 370 may operate in the form of software on a CPU or a GPU or may operate in an accelerated form by hardware. The decoded frame may be stored in the decoded picture buffer 390 for next encoding and decoding.

Figure 4:
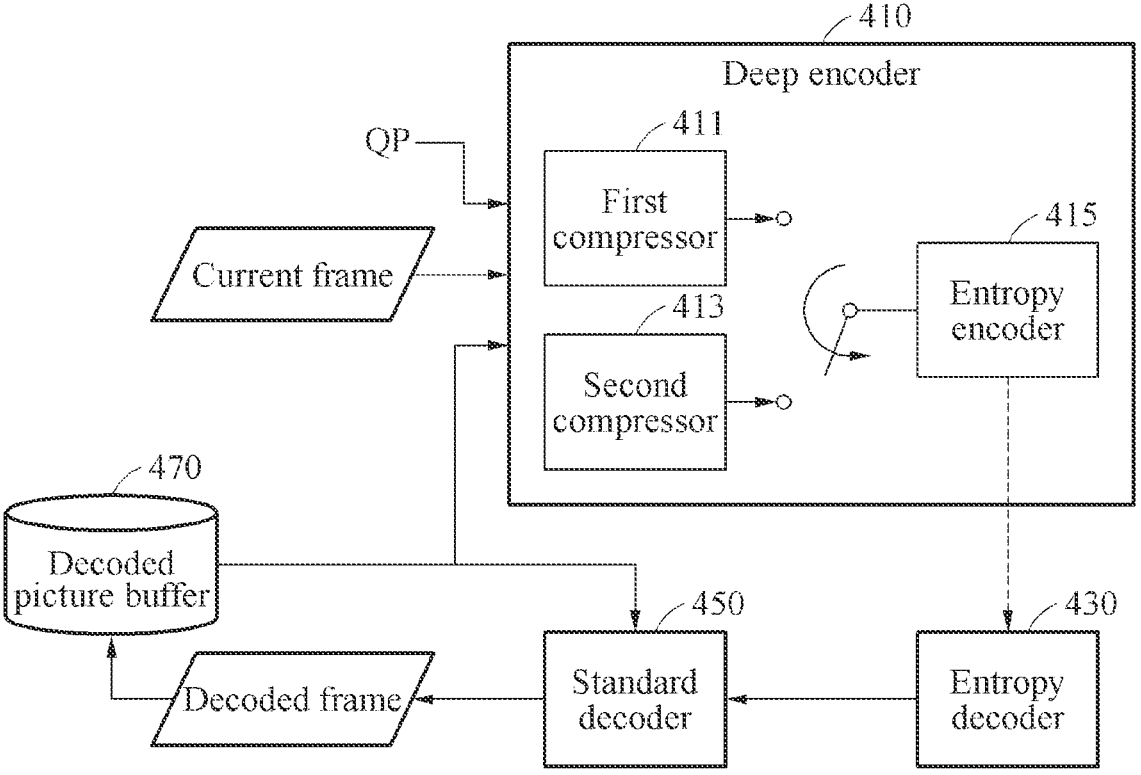
FIG. 4 illustrates an example of implementation of a video processing apparatus.

FIG. 4 illustrates an example of implementation of a video processing apparatus (e.g., the video processing apparatus of FIG. 1).

Referring to FIG. 4, a deep encoder 410 may perform encoding using a plurality of neural networks. The plurality of neural networks may include a first neural network and a second neural network.

The deep encoder 410 may be constituted by a set of a plurality of modules processing a process of converting a current frame into a bitstream. The deep encoder 410 may be constituted by one neural network-based module or a sub-module in a functional unit depending on an embodiment.

The deep encoder 410 may be constituted by two neural networks having different functions depending on an intra mode or an inter-mode. Alternatively, the deep encoder 410 may be constituted by a set of a plurality of neural networks, such as a block partitioning module, a motion estimation module, a motion compensation module, and a filtering mode decision module, based on an element technique.

As shown in the example of FIG. 4, the deep encoder 410 may include a first compressor 411 and a second compressor 413. The first compressor 411 and the second compressor 413 may be implemented by using different neural networks. In an example, the first compressor 411 may include the first neural network and the second compressor 413 may include the second neural network.

An entropy encoder 415 may selectively use outputs of the first compressor 411 and the second compressor 413 through switching.

An entropy decoder 430, a standard decoder 450, and a decoded picture buffer 470 may operate in the same manner as the entropy decoder 350, the standard decoder 370, and the decoded picture buffer 390 of FIG. 3, respectively.

The deep encoder 410 may easily perform optimization and replacement for each module by performing encoding using a plurality of functional modules. In addition, the deep encoder 410 may use a module used by a conventional codec encoder in a plug-in manner. In this case, the deep encoder 410 may partially include a non-differentiable operator.

Figure 5:
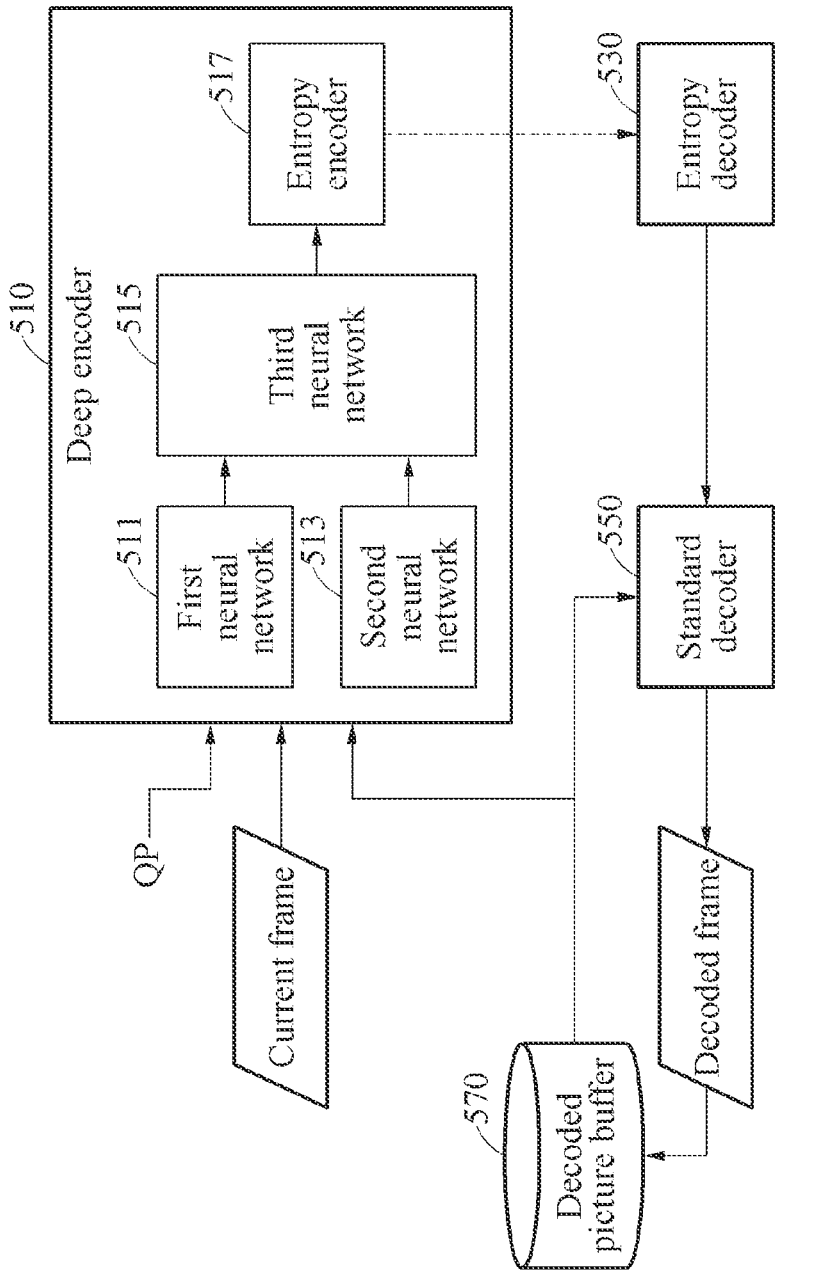
FIG. 5 illustrates an example of implementation of a video processing apparatus.

FIG. 5 illustrates an example of implementation of a video processing apparatus (e.g., the video processing apparatus of FIG. 1).

Referring to FIG. 5, a deep encoder 510 may perform encoding using a plurality of neural networks. The plurality of neural networks may include a first neural network 511, a second neural network 513, and a third neural network 515.

The deep encoder 510 may be constituted by a set of a plurality of modules processing a process of converting a current frame into a bitstream. The deep encoder 510 may be constituted by one neural network-based module or a sub-module in a functional unit depending on an embodiment.

The deep encoder 510 may be constituted by two neural networks having different functions depending on an intra mode or an inter-mode. Alternatively, the deep encoder 510 may be constituted by a set of a plurality of neural networks, such as a block partitioning module, a motion estimation module, a motion compensation module, and a filtering mode decision module, based on an element technique.

The deep encoder 510 may perform selective encoding by CTU by separating a separate module performing intra-prediction and inter-prediction.

The first neural network 511, the second neural network 513, and the third neural network 515 may be constituted by different neural networks. The first neural network 511 may perform intra-prediction. The second neural network 513 may perform inter prediction.

The third neural network 515 may generate a syntax element by performing syntax generation based on an intra-prediction result and an inter-prediction result.

An entropy encoder 517 may perform entropy encoding on an output of the third neural network 515.

An entropy decoder 530, a standard decoder 550, and a decoded picture buffer 570 may operate in the same manner as the entropy decoder 350, the standard decoder 370, and the decoded picture buffer 390 of FIG. 3, respectively.

In addition, the deep encoder 510 may gather outputs of the plurality of neural network modules, such as block partitioning, motion estimation, selection of prediction modes, and may use the outputs as inputs of syntax generation.

Figure 6:
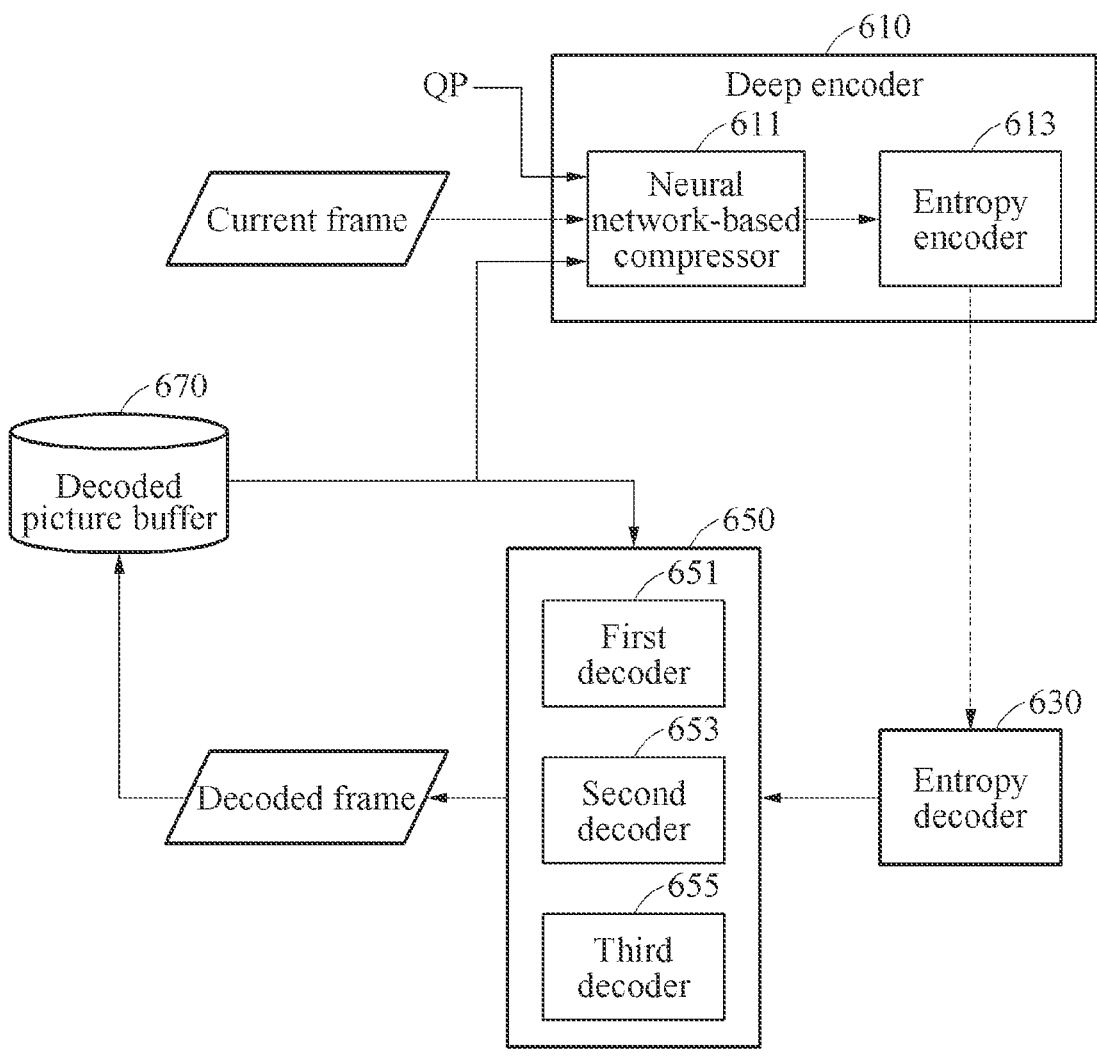
FIG. 6 illustrates an example of implementation of a video processing apparatus.

FIG. 6 illustrates an example of implementation of a video processing apparatus (e.g., the video processing apparatus of FIG. 1).

Referring to FIG. 6, a decoder module 650 may include a plurality of decoders including a first decoder 651, a second decoder 653, and a third decoder 655. FIG. 4 illustrates that the decoder module 650 includes three decoders 651, 653, and 655, however, the number of decoders included in the decoder module 650 is not limited thereto and various numbers of decoders may be adopted. The decoder module 650 may be hardware processing at least one function or operation.

The plurality of decoders 651, 653, and 655 may be a decoder of standard codec (e.g., advanced video coding (AVC), high efficiency video coding (HEVC), versatile video coding (VVC), alliance for open media video 1 (AV1), VP9, and essential video coding (EVC)). Alternatively, even when the plurality of decoders 651, 653, and 655 is not a standard codec decoder, a deep encoder 610 may operate as a general-purpose encoder that is able to be integrated with the plurality of encoders 651, 653, and 655.

The deep encoder 610 may operate neural networks respectively compatible with the plurality of decoders 651, 653, and 655, on an NPU mounted on a mobile SoC. For this, the deep encoder 610 may change or update a weight and/or a parameter of the neural network based on each of the plurality of decoders 651, 653, and 655. A decoded picture buffer 670 may store a frame decoded for each of the plurality of decoders 651, 653, and 655.

A neural network-based compressor 611 may generate a syntax element that may be decoded by the plurality of decoders 651, 653, and 655, as necessary.

For example, the video processing apparatus may determine to perform decoding through the second decoder 653 among the plurality of decoders 651, 653, and 655. In this case, the neural network-based compressor 611 may generate a syntax element converted at a compression rate that is suitable for a quantization parameter using a list of reference images, which are obtained by decoding a current input frame through the second decoder 653. An entropy encoder 613 may generate a bitstream by receiving the syntax element and may transmit the bitstream to the second decoder 653. The entropy encoder 613 may generate a syntax element by the received bitstream. The second decoder 653 may reconstruct a decoded frame using an image stored in the decoded picture buffer 670. Alternatively or additionally, an entropy decoder 630 may convert the bitstream generated by the entropy encoder 613 into the syntax element and transmit the syntax element to the second decoder 653.

Figure 7:
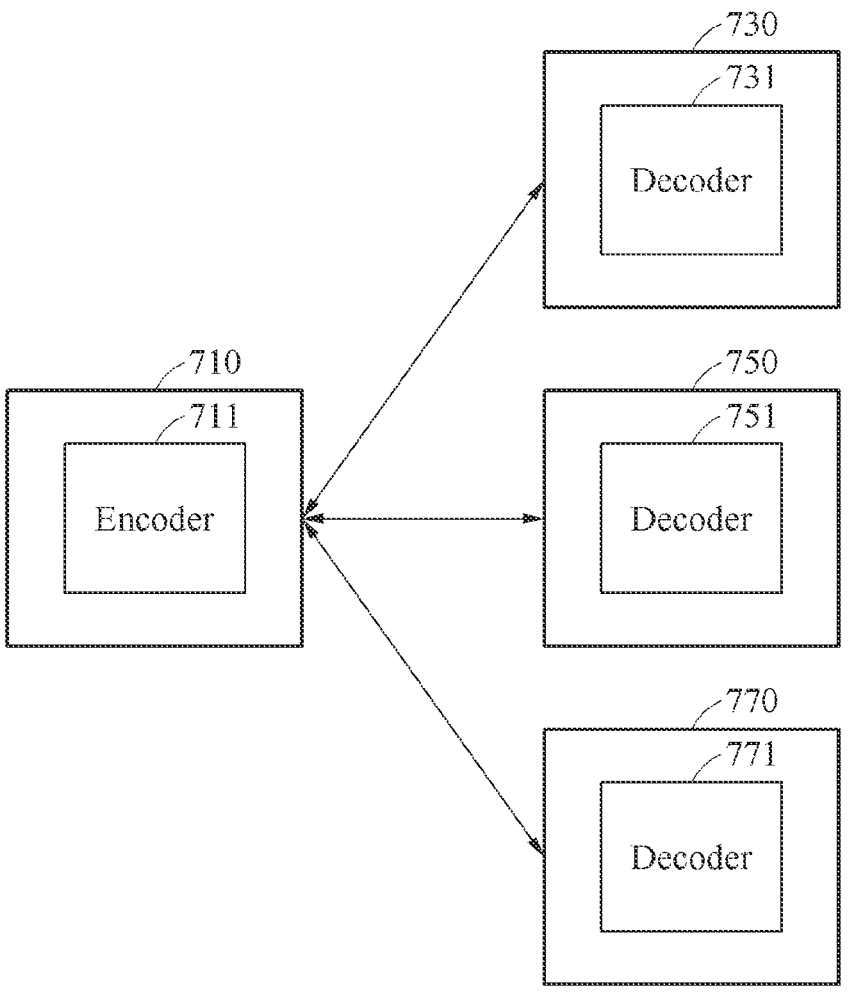
FIG. 7 illustrates an example of implementation of a video processing apparatus.

FIG. 7 illustrates an example of a video processing apparatus.

FIGS. 1 to 6 describe that an encoder and a decoder are included in one video processing apparatus, however, depending on an embodiment, the video processing apparatus may include either one of an encoder and a decoder.

For example, referring to FIG. 7, a first video processing apparatus 710 may include only one encoder 711, and a second video processing apparatus 730, a third video processing apparatus 750, and a fourth video processing apparatus 770 may each include only one of decoders 731, 751, and 771, respectively. The decoders 731, 751, and 771 may not need to be the same type of decoders, and may be different types of decoders.

The first video processing apparatus 710 may generate an encoded video by encoding a video and may transmit the encoded video to the second video processing apparatus 730, the third video processing apparatus 750, and the fourth video processing apparatus 770. The encoder 711 of the first video processing apparatus 710 may operate neural networks respectively compatible with the decoders 731, 751, and 771, on an NPU mounted on a mobile SoC. For this, the encoder 711 may change or update a weight and/or a parameter of the neural network based on each of the plurality of decoders 731, 751, and 771. However, the first video processing apparatus 710 may not need to simultaneously transmit to all of the second video processing apparatus 730, the third video processing apparatus 750, and the fourth video processing apparatus 770.

The second video processing apparatus 730, the third video processing apparatus 750, and the fourth video processing apparatus 770 may generate, through decoders respectively included therein, a reconstructed video by decoding the encoded video transmitted by the first video processing apparatus 710.

FIG. 7 illustrates that one video processing apparatus 710 communicates with three video processing apparatuses 730, 750, and 770. However, the number of video processing apparatuses, which are communication targets, is not limited thereto and various numbers may be adopted.

However, FIG. 7 only describes a video processing method among video processing apparatuses of which an encoder and a decoder are separated and other descriptions (e.g., the encoding method, the decoding method, and the like) provided with reference to FIGS. 1 to 6 may be applicable to FIG. 7.

Figure 8:
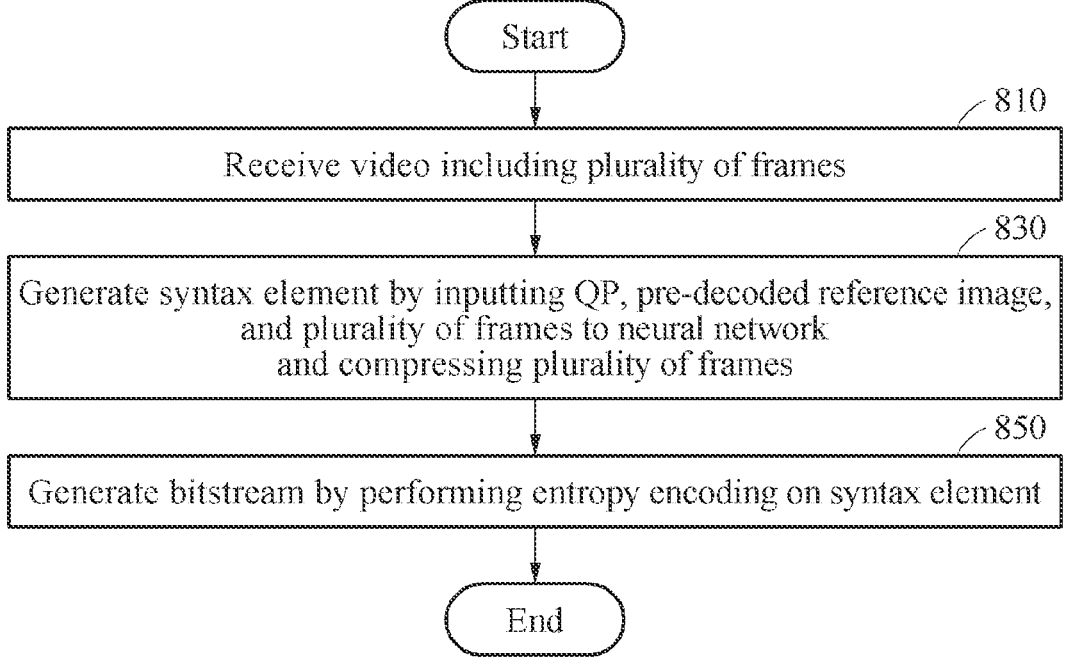
FIG. 8 illustrates an example of an operation of a video processing apparatus.

FIG. 8 illustrates an example of an operation of a video processing apparatus (e.g., the video processing apparatus of FIG. 1). Some of operations of FIG. 8 may be performed simultaneously or in parallel to another operation and the order of operations may change. In addition, some of the operations may be omitted or another operation may be additionally performed.

Referring to FIG. 8, in operation 810, a receiver (e.g., the receiver 100 of FIG. 1) may include a video including a plurality of frames.

In operation 830, a processor (e.g., the processor 200 of FIG. 1) may generate a syntax element processable by a target standard codec by compressing a plurality of frames by inputting a QP, a pre-decoded reference image, and the plurality of frames to the neural network.

The processor 200 may include a first neural network and a second neural network. The first neural network may be different from the second neural network.

The processor 200 may adjust the QP based on the shape of adaptive instance normalization of a layer constituting the neural network and a product or sum of features at an arbitrary level.

The processor 200 may generate a pre-decoded reference image by decoding a bitstream generated based on a frame that is decoded at a previous time point of the current time point among the plurality of frames.

The processor 200 may generate a decoded syntax element by performing entropy decoding on a bitstream. The processor 200 may generate a pre-decoded reference image by decompressing the decoded syntax element.

The processor 200 may train the neural network. The processor 200 may train the neural network based on an RD loss. The processor 200 may determine a balance parameter based on the QP. The processor 200 may calculate the RD loss based on the balance parameter and the syntax element.

The processor 200 may perform intra-prediction through the first neural network. The processor 200 may perform inter-prediction through the second neural network.

The processor 200 may select one from an output of the first neural network and an output of the second neural network. The processor 200 may perform entropy encoding on the selected output.

The processor 200 may partition the plurality of frames into a plurality of blocks through the first neural network. The processor 200 may perform motion estimation and compensation by inputting the plurality of blocks to the second neural network.

In operation 850, the processor 200 may generate a bitstream by performing entropy encoding on the syntax element.

The video processing apparatuses, receivers, processors, memories, deep encoders, neural network-based compressors, entropy encoders, entropy decoders, standard decoders, decoded picture buffers, decoded picture buffers, first compressors, second compressors, decoders, decoder modules, video processing apparatus 10, receiver 100, processor 200, memory 300, deep encoder 210, neural network-based compressor 211, entropy encoder 213, entropy decoder 230, standard decoder 250, decoded picture buffer 270, neural network-based compressor 310, entropy encoder 330, entropy decoder 350, standard decoder 370, decoded picture buffer 390, deep encoder 410, first compressor 411, second compressor 413, entropy encoder 415, entropy decoder 430, standard decoder 450, decoded picture buffer 470, deep encoder 510, entropy encoder 517, entropy decoder 530, standard decoder 550, decoded picture buffer 570, deep encoder 610, neural network-based compressor 611, entropy encoder 613, entropy encoder 630, decoder module 650, decoders 651, 653, and 655, decoded picture buffer 670, first video processing apparatus 710, encoder 711, second video processing apparatus 730, third video processing apparatus 750, fourth video processing apparatus 770, decoders 731, 751, and 771, and other apparatuses, devices, units, modules, and components disclosed and described herein with respect to FIGS. 1-8 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus with video processing, the apparatus comprising:

one or more processors configured to:

generate, based on decoder information on a decoder among a plurality of decoders, syntax elements processable by a target decoder of a target standard codec by inputting a quantization parameter, a predecoded reference image, and a plurality of frames comprised in a video to neural networks and compressing the plurality of frames, and generate a bitstream by performing entropy encoding on the syntax elements.

2. The apparatus of claim 1, wherein the syntax elements comprises a coding unit (CU) partition, a prediction unit (PU) partition, a PU prediction mode, and a transform unit (TU) partition.

3. The apparatus of claim 1, wherein the pre-decoded reference image is decoded at a time point before a time point when input frame is encoded.

4. The apparatus of claim 1, wherein, for the generating of the pre-decoded reference image, the one or more processors are further configured to:

generate decoded syntax elements by performing entropy decoding on the bitstream, and generate the pre-decoded reference image by decompressing the decoded syntax elements.

5. The apparatus of claim 4, wherein the decoder is a target decoder comprising a decoder of a standard codec, and the decoded syntax elements are decodable by the target decoder.

6. The apparatus of claim 1, wherein the neural networks comprise a first neural network and a second neural network.

7. The apparatus of claim 6, wherein, for the generating of the bitstream, the one or more processors are further configured to:

select one from an output of the first neural network and an output of the second neural network, and perform entropy encoding on the selected output.

8. The apparatus of claim 6, wherein, for the generating of the syntax elements, the one or more processors are further configured to perform either one or both of:

intra-prediction through the first neural network; and inter-prediction through the second neural network.

9. The apparatus of claim 7, wherein, for the generating of the syntax elements, the one or more processors are further configured to:

partition the plurality of frames into a plurality of blocks through the first neural network, and perform motion estimation and compensation by inputting the plurality of blocks to the second neural network.

10. The apparatus of claim 1, wherein, for the generating of the syntax elements, the one or more processors are further configured to adjust the quantization parameter based on a shape of adaptive instance normalization of a layer constituting the neural networks and a product or sum of features at an arbitrary level.

11. The apparatus of claim 1, wherein, for the generating of the syntax elements, the one or more processors are further configured to:

receive the decoder information on the decoder to perform decoding among a plurality of decoders, and generate the syntax elements by considering the decoder information.

12. A processor-implemented method with video processing, the method comprising:

generating, based on decoder information on a decoder among a plurality of decoders, syntax elements processable by a target decoder of a target standard codec by inputting a quantization parameter, a pre-decoded reference image, and a plurality of frames comprised in a video to neural networks and compressing the plurality of frames; and generating a bitstream by performing entropy encoding on the syntax elements.

13. The method of claim 12, wherein the syntax elements comprises a coding unit (CU) partition, a prediction unit (PU) partition, a PU prediction mode, and a transform unit (TU) partition.

14. The method of claim 12, wherein the pre-decoded reference image is decoded at a time point before a time point when input frame is encoded.

15. The method of claim 12, wherein the generating of the pre-decoded reference image comprises:

generating decoded syntax elements by performing entropy decoding on the bitstream; and generating the pre-decoded reference image by decompressing the decoded syntax elements.

16. The method of claim 15, wherein the decoder is a target decoder comprising a decoder of a standard codec, and the decoded syntax elements are decodable by the target decoder.

17. The method of claim 12, wherein the neural networks comprise a first neural network and a second neural network.

18. The method of claim 17, wherein the generating of the bitstream comprises:

selecting one from an output of the first neural network and an output of the second neural network; and performing entropy encoding on the selected output.

19. The method of claim 17, wherein the generating of the syntax elements comprises either one or both of:

performing intra-prediction through the first neural network; and performing inter-prediction through the second neural network.

20. The method of claim 18, wherein the generating of the syntax elements comprises:

partitioning the plurality of frames into a plurality of blocks through the first neural network; and performing motion estimation and compensation by inputting the plurality of blocks to the second neural network.

21. The method of claim 12, wherein the generating of the syntax elements comprises adjusting the quantization parameter based on a shape of adaptive instance normalization of a layer constituting the neural networks and a product or sum of features at an arbitrary level.

22. The method of claim 12, wherein the generating of the syntax elements comprises:

receiving the decoder information on the decoder to perform decoding among a plurality of decoders; and generating the syntax element by considering the decoder information.

* * * * *